(12) United States Patent
Kobayashi et al.

(10) Patent No.: US 7,168,469 B2
(45) Date of Patent: Jan. 30, 2007

(54) RADIAL TIRE INCLUDING TWO SMALL SLANT BELT LAYERS

(75) Inventors: Kazuomi Kobayashi, Kodaira (JP); Shuji Ando, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 346 days.

(21) Appl. No.: 10/479,712

(22) PCT Filed: Jun. 5, 2002

(86) PCT No.: PCT/JP02/05562

§ 371 (c)(1),
(2), (4) Date: Dec. 5, 2003

(87) PCT Pub. No.: WO02/098682

PCT Pub. Date: Dec. 12, 2002

(65) Prior Publication Data

US 2004/0159387 A1  Aug. 19, 2004

(30) Foreign Application Priority Data

Jun. 5, 2001 (JP) .............................. 2001-169001

(51) Int. Cl.
*B60C 9/20* (2006.01)
*B60C 9/22* (2006.01)

(52) U.S. Cl. ...................... 152/527; 152/526; 152/531; 152/538

(58) Field of Classification Search ................ 152/538, 152/531, 526, 527
See application file for complete search history.

(56) References Cited

U.S. PATENT DOCUMENTS 5,637,163 A     6/1997  Kobayashi
5,688,344 A  * 11/1997  Kobayashi et al. .......... 152/527
5,827,381 A  * 10/1998  Miyazono et al. .......... 152/526
5,855,703 A  *  1/1999  Miyazono et al. .......... 152/527
6,082,427 A     7/2000  Kohno et al.

FOREIGN PATENT DOCUMENTS

| EP | 1 072 444 A1 | * | 1/2001 |
|---|---|---|---|
| JP | 2-088306 A | | 3/1990 |
| JP | 05270210 A | * | 10/1993 |
| JP | 05270212 A | * | 10/1993 |
| JP | 05278411 A | * | 10/1993 |
| JP | 05278412 A | * | 10/1993 |
| JP | 6-143920 A | | 5/1994 |
| JP | 07096713 A | * | 4/1995 |
| JP | 07096714 A | * | 4/1995 |
| JP | 2000225810 A | * | 8/2000 |
| JP | 2002225507 A | * | 8/2002 |

* cited by examiner

*Primary Examiner*—Adrienne C. Johnstone
(74) *Attorney, Agent, or Firm*—Sughrue Mion, PLLC

(57) ABSTRACT

This invention is concerned with a radial tire, particularly a heavy duty radial tire aiming at the improvement of durability, and is characterized by rendering a ratio W2/W1 of width W1 of a belt layer located side a carcass to width W2 of the remaining belt layer in small slant belt layers arranged at a width corresponding to 0.25–0.50 times a tread width in a widthwise direction of the tire, whereby growth and progress of cracks in the vicinity of cord ends of cords used in the belt resulting in separation failure at widthwise ends of the belt are effectively prevented to overcome a weak point in the tread reinforcement of the radial tire.

12 Claims, 15 Drawing Sheets

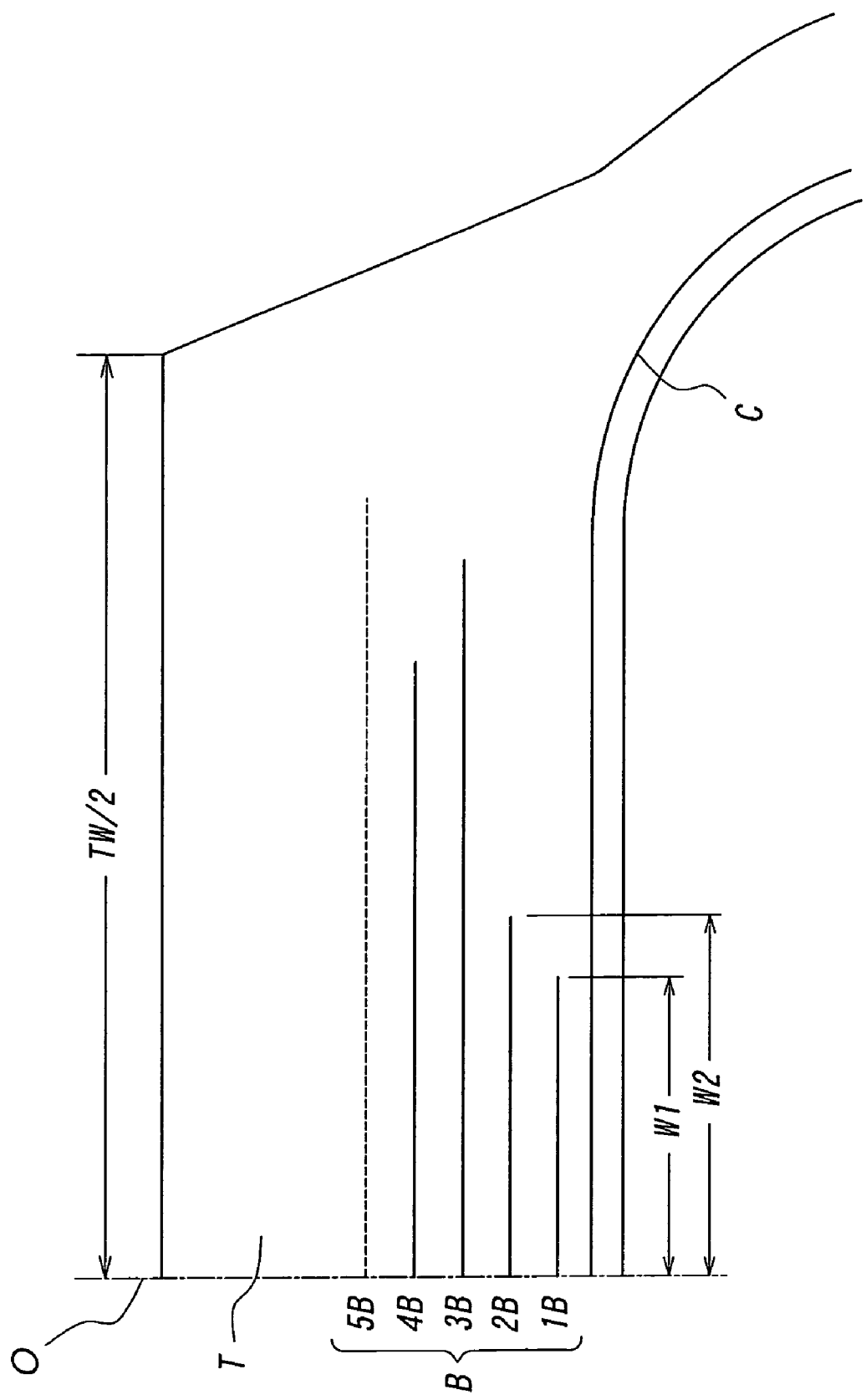

RADIAL TIRE INCLUDING TWO SMALL SLANT BELT LAYERS

TECHNICAL FIELD

This invention relates to a radial tire, and more particularly to a heavy duty radial tire aiming at the improvement of durability by improving a belt for the reinforcement of a tread.

BACKGROUND ART

In heavy duty radial tires such as tires for trucks and buses, tires for construction vehicles and the like, a main belt layer is generally constructed by combining a large slant belt layer(s), in which cords of a rubberized cord layer are arranged side by side at a large inclination angle with respect to an equatorial plane of the tire, for example at an inclination angle of 20–70° and usually embedded at equal intervals, with a small slant belt layer(s), in which cords of a rubberized cord layer are arranged side by side at a small inclination angle with respect to the equatorial plane of the tire, for example at an inclination angle of 5–15° and usually embedded at equal intervals.

That is, a rigidity to deformation along a face of the belt (hereinafter referred to as in-plane bending rigidity) is ensured by the large slant belt layer. On the other hand, the small slant belt layer bears tension in a circumferential direction of the tread owing to the arrangement of cords having a small inclination angle and controls a growth of a tread size to prevent a change of a crown shape during the running.

Further, the main belt layer is usually comprised of two small slant belt layers and one or two large slant belt layers outward from a side of the carcass in a radial direction or 3 to 4 layers in total. In this case, it is effective that the small slant belt layers are arranged in a direction of crossing cords with each other between the adjoining layers for bearing the tension in the circumferential direction of the tread, and also that when the large slant belt layer located outside the small slant belt layer is comprised of two layers, the cords of these layers are crossed with each other between the adjoining layers for enhancing the in-plane bending rigidity, and that the cords are crossed with each other between the adjoining small slant belt layer and large slant belt layer for preventing strain concentration in the small slant belt layer nearest to the carcass.

In the main belt layer, therefore, it is advantageous to arrange the cords of all layers so as to cross them with each other between the adjoining layers in view of the control of size growth in the tread, the improvement of in plane bending rigidity and the dispersion of strain at belt end.

When the tire is run under loading, the occurrence of shear strain can not be avoided at an end zone of the belt. Especially, as the cord inclination angle in the belt becomes smaller and as the width of the belt becomes wider, the shear strain generated is large, so that cracks are caused at the belt end positioning rubber and cords ends not covered therewith and grow to separation failure between the layers and hence bring about the breakage of the tire.

Here, the large slant belt layer is large in the cord inclination angle and small in the shear strain generated, so that it is possible to widen the belt width and the securement of in-plane bending rigidity as its main object is easy.

On the other hand, since a main object of the small slant belt layer is to realize the control of the tread size growth, it is indispensable that the cord inclination angle is made small and a minimum belt width is ensured, but it is obliged to narrow the belt width or to set the cord inclination angle to a large value for decreasing the shear strain during the running of the tire under loading. In any case, however, the control of the tread size growth becomes insufficient and hence the size growing amount increases during the running and the resistance to cut separation, heat resistance and wear resistance are deteriorated. That is, in case of the small slant belt layer having a small cord inclination angle, it is advantageous to widen the width and make the cord inclination angle smaller for the control of the tread size growth, but the realization of them is obstructed by the occurrence of separation failure starting from the belt end as mentioned above.

DISCLOSURE OF THE INVENTION

It is, therefore, an object of the invention to propose a way capable of applying the small slant belt layer with a wider width by controlling the occurrence of cracks at an end portion of the small slant belt layer easy to generate strain.

The inventors have made various studies with respect to a relation among cord inclination angle and width in the belt, size growth of the tread portion and belt durability. That is, the size growth of the tread portion and the belt durability are examined under conditions of variously changing the cord inclination angle and the belt width as shown in Table 1. The results are also shown in Table 1, while results summarized every evaluation item are shown in FIGS. 1 and 2. Moreover, the size growth of the tread portion is represented by an index after the size growing amount at a central portion of the tread is measured by changing an internal pressure of the tire from 50 kPa to 700 kPa, and the belt durability is represented by an index on a running time until the impossibility of the running due to belt troubles in the running test on a drum as mentioned later.

TABLE 1

| Belt width/tread width (%) | Cord inclination angle α (°) | Index of durability on drum | Index of size growth |
|---|---|---|---|
| 40 | 20 | 100 | 100 |
| 40 | 16 | 99 | 95 |
| 40 | 8 | 80 | 77 |
| 40 | 4 | 56 | 70 |
| 20 | 4 | 90 | 114 |
| 33 | 4 | 77 | 86 |
| 40 | 4 | 66 | 68 |
| 60 | 4 | 40 | 55 |

At first, it has been confirmed that as shown in FIG. 1a, when the cord inclination angle is not more than 15°, the belt durability rapidly lowers, while as the cord inclination angle becomes smaller as shown in FIG. 1b, the size growth of the tread portion is controlled. Therefore, the control of the size growth of the tread portion is attained by setting the cord inclination angle to not more than 15° and controlling cracks at the belt end.

Also, it has been confirmed that as shown in FIG. 2a, when the belt width is not less than 0.25 times the tread width, i.e. as the width becomes wider, the belt durability is deteriorated, while as shown in FIG. 2b, the size growth of the tread portion is controlled as the width becomes wider. Therefore, the control of the size growth of the tread portion is attained by setting the belt width to not less than 0.25 times the tread width and controlling cracks at the belt end.

On the other hand, when the belt width exceeds 0.50 times the tread width, the effect of controlling the size growth by widening the belt width is saturated, while the lowering of the durability due to the increase of strain becomes large, so that the belt width is not more than 0.50 times the tread width.

The term "tread width" used herein means a ground contact width of the tread, i.e. a maximum width of the ground contact area of the tread when the internal tire pressure and the rim satisfy the following conditions under loading. That is, the loading means a maximum load per one wheel of an approved size described on JATMA Year Book (maximum load capacity), and the internal tire pressure means an air pressure corresponding to the maximum load (maximum load capacity) of the approved size described on the above standard, and the rim means a standard rim in the approved size described on the above standard.

Then, the inventors have examined the occurrence of cracks at the end portion of the belt having the combination of the small slant belt layer(s) and the large slant belt layer(s) as a main belt layer in detail.

As a half of the belt is shown in FIG. 3 bordering an equatorial plane O of the tire, the main belt layer is constructed with small slant belt layers 1B and 2B and large slant belt layers 3B and 4B in order from the carcass side and a protection belt layer 5B is arranged on the large slant belt layer 4B. In the conventional belt having such a belt structure, the cord inclination angle with respect to the equatorial plane O and the width in all belt layers have specifications shown in Table 2.

TABLE 2

| Belt | Cord inclination angle (°) | Belt half-width (mm) |
|---|---|---|
| 5B | 35 upward to the right | 440 |
| 4B | 30 upward to the left | 350 |
| 3B | 25 upward to the right | 400 |
| 2B | 5 upward to the left | 170 |
| 1B | 5 upward to the right | 200 |

At first, as a result of analysis on strain at end portions of the small slant belt layers 1B and 2B resulting in the occurrence of cracks, it has been newly confirmed that since all cords of the small slant belt layers 1B, 2B and the large slant belt layers 3B, 4B are crossed with each other between mutual layers and the cords in the belt layers 1B and 3B sandwiching the end of the belt layer 2B are crossed with the cords of the belt layer 2B, when elongation in the circumferential direction is created at the end portion of the belt subjected to the load during the running of the tire under loading, the displacement of the belt layer 2B becomes opposite to the displacements of the belt layers 1B and 3B and as a result, shear strain concentrates in radially outside of the end portion of the belt layer 2B (hereinafter referred to as above) and radially inside thereof (hereinafter referred to as beneath).

A relatively large strain is created above the end portion of the belt layer 1B, because the cords of the belt layer 3B located thereabove are arranged in the same direction as in the cords of the belt layer 1B, but the belt layer is existent inward from the belt layer 3B in the radial direction, so that tensile amount applied to the end portion of the belt layer 1B is large and the width of the layer 1B is wider than that of the layer 2B. On the other hand, the occurrence of strain is very small beneath the end portion of the belt layer 1B because the cord inclination angle is small and a distance up to the carcass is relatively existent to a certain level. Therefore, strain comes into problem above the end of the belt layer 1B and above and beneath the end of the belt layer 2B.

The results examined on the occurrence of cracks at the belt end and growth thereof when the tire having the above conventional belt is subjected to a drum test for the durability are schematically shown in FIGS. 4a to 4c.

That is, the state of creating cracks at the belt end is examined by stopping the running of the tire in the course of running on the drum. At a time of running distance on drum of 1000 km, as shown in FIG. 4a, three cracks K1–K3 are first created above the belt layer 1B and above and beneath the belt layer 2. They are generated in accordance with the magnitude of strain at each end of the belt layers.

At a time of running distance on drum of 2000 km, as shown in FIG. 4b, each of the above cracks K1–K3 grow and the cracks K1 and K2 are connected each other above the belt layer 1B and beneath the belt layer 2B.

Further, at a time of running distance on drum of 3500 km, as shown in FIG. 4c, the growing rate of the connected cracks K1 and K2 is very fast as compared with those of the other crack K3 and cracks K1 and K2 before connecting, so that the connected crack prematurely progresses along the belt layer between the belt layer 1B and the belt layer 2B, from which it has been found that the separation failure between the belt layers is easily caused. Therefore, the separation failure between the belt layers particularly comes into problem above the belt layer 1B and above and beneath the belt layer 2B.

The inventors have made various studies with respect to means for avoiding the growth of the cracks based on the above knowledge relating to the process of generating belt separation and found that it is very effective to control the width of the two small slant belt layers for reducing strain resulting in the occurrence of strain, and as a result the invention has been accomplished.

Namely, the gist and construction of the invention are as follows.

(1) A radial tire comprising a belt of at least three rubberized layers arranged on an outer face of a crown portion of a carcass in a radial direction, each containing many cords extending obliquely with respect to an equatorial plane of the tire and cords of which layers being crossed with each other between adjoining layers, characterized in that two layers of the belt arranged toward a side of the carcass are small slant belt layers of many rubberized cords each extending at a cord inclination angle of not more than 15° with respect to the equatorial plane of the tire and having a width corresponding to 0.25–0.50 times a tread width in a widthwise direction of the tire, and a ratio W2/W1 of a width W2 of one belt layer to a width W1 of the other belt layer located toward the side of the carcass in the small slant belt layers is within a range of 1.1–1.3.

(2) A radial tire according to the item (1), wherein the small slant belt layer has a cord arrangement that individual cords occupied in the layer are divided into plural packets each containing several cords and a distance between a packet and a cord adjacent thereto is widened as compared with an interval between adjoining cords in each of the packets.

(3) A radial tire according to the item (2), wherein not less than 30% of the cords in the small slant belt layer are made into packets.

(4) A radial tire according to the item (2) or (3), wherein the small slant belt layer satisfies the following relation:

$$1/5 \leq Q i \times N/n \leq 3/4$$

in which N is a mean number of cords embedded per unit width in a direction perpendicular to the cord of the small slant belt layer, and n is the number of cords in each packet, and Qi is a distance of an interval portion between a packet and a cord adjacent thereto in a direction perpendicular to the cord.

(5) A radial tire according to the item (2), (3) or (4), wherein a sum of length between cord packets in a circumferential direction of the tire Qi/sin θ at one side edge of the small slant belt layer over a full circumference of the tire satisfies the following relation to a circumferential length L at such a side edge:

$$L \times \frac{1}{5} \leq \Sigma(Qi/\sin \theta) \leq L \times \frac{3}{4}$$

(6) A radial tire according to any one of the items (2) to (5), wherein an interval Pi between adjoining cords in the packet and an interval Po between cords when cords having a cord diameter d are uniformly arranged side by side over a full circumference of the tire satisfy the following relation:

$$-d < Pi < P0$$

(7) A radial tire according to any one of the items (2) to (6), wherein at least two mutually adjoining cords in the packet are partly contacted with each other.
(8) A radial tire according to any one of the items (2) to (7), wherein a difference in radial distance between inscribed circle and circumscribed circle of the packet containing plural cords from an axial center of the tire is within a range of 1–3 times a diameter of the cord.
(9) A radial tire according to any one of the items (1) to (8), wherein a diameter of the cord is 2.5–4.0 mm.
(10) A radial tire according to any one of the items (2) to (9), wherein the number of cords in each packet is 2–5.
(11) A radial tire according to any one of the items (2) to (10), wherein a distance between adjoining cords in each packet is 0.2–0.5 mm, and a distance from the packet to a cord adjacent thereto is 2–10 mm.
(12) A radial tire according to any one of the items (1) to (11), wherein a ratio I/A of a sectional secondary moment I of the cord to a sectional area A of the cord is not less than 0.015.

As the cord may be used a cord formed by twisting plural filaments or a monofilament cord made of a single filament, and steel or chemical fiber may be applied as a material thereof.

In FIG. 5 is shown a widthwise section of a main part in the radial tire for construction vehicles according to the invention.

This tire comprises a belt B of at least three layers, five layers in the illustrated embodiment, and a tread T arranged on a radially outside of a crown portion of a carcass C toroidally extending between a pair of bead portions (not shown).

The belt B is constructed by laminating two small slant belt layers 1B and 2B, two large slant belt layers 3B and 4B and one protection belt layer 5B outward from the side of the carcass C in a radial direction in this order. That is, the belt layers 1B–5B in the belt B are arranged so as to cross cords of rubberized cord layers containing many cords arranged obliquely with respect to an equatorial plane O of the tire side by side with each other, in which the belt layers 1B and 2B are small slant belt layers each containing cords extended at an inclination angle of not more than 15°, preferably 3–12° with respect to the equatorial plane O of the tire and having widths W1 and W2 corresponding to 0.25–0.50 times a tread width TW, and the belt layers 3B and 4B are large slant belt layers having a wider width and a larger cord inclination angle as compared with the small slant belt layers 1B and 2B.

Moreover, the protection belt layer 5B is a rubberized layer having a relatively wide width and a cord arrangement that the cords are extended at a relatively large inclination angle with respect to the equatorial plane O of the tire, and has mainly a function as a protection layer when the tire is subjected to external injury.

In the small slant belt layers 1B and 2B, the reduction of strain under the small slant belt layer 2B is particularly effective to avoid the separation failure between the belt layers. That is, when strain at end portions of the small slant belt layers 1B and 2B, which causes the occurrence of cracks, are analyzed in the belt structure shown in FIG. 5 having specifications shown in Table 3 on cord inclination angle with respect to the equatorial plane O of the tire and width in each belt layer, it has been elucidated that the occurrence of strain beneath the small slant belt layer 2B is slight likewise the case beneath the layer 1B. Also, strain beneath the small slant belt layer 1B is reduced by a rate that the width of the belt layer is narrowed. On the other hand, strain beneath the small slant belt layer 2B is disadvantageously increased by a rate that the width of the layer 2B is wider than the layer 1B, but there is no restraint beneath the small slant belt layer 2B through the small slant belt layer 1B, and hence there is no increase of strain as compared with the conventional belt structure.

TABLE 3

| Belt | Cord inclination angle (°) | Belt half-width (mm) |
|---|---|---|
| 5B | 35 upward to the right | 440 |
| 4B | 30 upward to the left | 350 |
| 3B | 25 upward to the right | 400 |
| 2B | 5 upward to the left | 200 |
| 1B | 5 upward to the right | 170 |

Further, results examined on the occurrence of cracks at the belt end and growth thereof when the tire having the above belt structure is subjected to a durable test on a drum are schematically shown in FIGS. 6a to 6c.

That is, the state of generating cracks at the belt end is examined by stopping the running of the tire in the course of running on the drum. At first, as shown in FIG. 6a, two cracks K1 and K3 are generated above the belt layer 1B and above the belt layer 2B at a time of running on the drum over 1000 km. They are created through strain at each end of the belt layers, and the growth of the crack is equal to or less than the cracks K1 and K3 shown in FIG. 4a.

At a time of running on the drum over 2000 km, as shown in FIG. 4b, the cracks K1 and K3 grow, but they are not connected to each other as in the conventional belt, and the growing rate is substantially equal to that at the initial stage of generating the cracks.

At a time of running on the drum over 3500 km, as shown in FIG. 6c, each of the cracks K1 and K3 grows at a constant rate, but does not rapidly progress, so that it has been found that the occurrence of separation failure between the belt layers is avoided.

As mentioned above, it has been found that when the width ratio of the small slant belt layers 1B and 2B is made opposite to that of the conventional belt, the occurrence of strain at the belt end is reduced beneath each end of the belt layers and cracks are not connected to each other through propagation and hence the form of progressing the cracks can be improved.

Now, the crack length at the end portion of the small slant belt layer 2B at a time of running on the drum over 2000 km in the drum running test is examined by variously changing the widths of the small slant belt layers 1B and 2B. From the results as shown in FIG. 7, it has been found that under a basic condition that cracks are not generated beneath the small slant belt layer 2B, it is required to regulate the ratio W2/W1 to a range of 1.1–1.3 for controlling the occurrence of cracks above the belt layer 2B and above the belt layer 1B to an acceptable range (crack length: 45 mm). In FIG. 7 are also shown results of a cord packet when the cords in the belt are grouped under the same ratio W2/W1 as mentioned later.

That is, when the ratio W2/W1 is less than 1.1, the crack is generated beneath the small slant belt layer 2B likewise the conventional belt structure and connected to the crack above the small slant belt layer 1B to considerably increase the progressing rate of the crack, whereby the separation between the belt layers is easily generated.

On the other hand, when the ratio W2/W1 exceeds 1.3, the crack is not generated beneath the small slant belt layer 2B, but strain above the end of the belt layer 2B is increased because the width of the belt layer 2B is wider than that of the small slant belt layer 1B, and as a result, the crack above the end of the belt layer 2B is increased.

Further, as a developed view of the belt structure is shown in FIG. 8 as regards the small slant belt layers 1B and 2B, it is advantageous to provide a cord arrangement that cords 1 individually and independently included in each belt layer are grouped into packets 2 each containing several cords and an interval Qi between the packet 2 and a cord 1 adjacent to this packet 2 is made wider than an interval Pi between mutually adjoining cords 1 in each of the packets 2.

That is, as to the process of rubber breakage at the widthwise end of the small slant belt layer in the radial tire as previously mentioned, irrespective of the initial stage that fine cracks generated at ends of the cords progress along the surface of the cord, when the cords 1 are arranged side by side at equal intervals according to the conventional technique in the conventional belt structure as shown by a developed view in FIG. 9, it is disadvantageous that the cracks immediately grow between mutually adjoining cords 1 and connect to each other between the mutually laminated belt layers to rapidly enlarge and hence progress into belt separation.

On the contrary, according to the invention, as a section taken along X—X line of FIG. 8 is shown in FIG. 10, an interval Qi between packet 2 and packet 2 (or interval between cord 1 and packet 2 when cords 1 not grouped in the packet 2 are existent) is wider than the interval between adjoining cords in the conventional cord arrangement at equal intervals, so that the crack growth is not caused between the adjoining cords through the interval Qi and hence the subsequent enlargement of the cracks between the mutually laminated belt layers for rapidly progressing into the belt separation is suppressed effectively.

In the small slant belt layers 1B and 2B in which the width ratio W2/W1 of these belt layers is regulated to a range of 1.1–1.3, the crack length at the end portion of the small slant belt layer is examined at a time of running on the drum over 2000 km in the drum running test when the cords in each of these belt layers are grouped into packets. The results are shown in Table 4, from which it is understood that the crack length can be reduced to about ⅓ by grouping the cords of the belt layer into the packets.

TABLE 4

| | Cord arrangement at equal intervals | Cord arrangement of packets (mm) |
|---|---|---|
| Width of belt 1B: W1/2 | 170 | 170 |
| Width of belt 2B: W2/2 | 200 | 200 |
| Cord diameter in belt | 2.0 | 2.0 |
| Interval between packets Qi | — | 2.0 |
| Cord interval | Po: 0.8 | P1: 0.2 |
| Crack length after the running on drum over 2000 km | | |
| beneath belt 2B | 0 | 0 |
| above belt 2B | 38 | 13 |
| above belt 1B | 42 | 15 |

Moreover, when the cords are grouped into packets each containing several cords in order to widen the interval Qi as compared with the interval Pi, it is preferable that the interval Qi is widened considering that the interval Pi between the adjoining cords in the packet is not narrowed as compared with the cord interval Po in the conventional cord arrangement of equal interval (see FIG. 9) by decreasing the end count of cords while the total strength of the belt is made equal to that of the conventional belt by thickening the cord diameter (concretely about 2.5–4.0 mm) as seen from the comparison between FIGS. 8 and 9.

Also, it is preferable to arrange not less than 30% of the cords constituting the small slant belt layers 1B and 2B by grouping into cord packets. That is, it is advantageous to group at least 30% of the cords into packets in order to obtain cord intervals required for preventing propagation of cracks generated at the cord ends while maintaining the rigidity in the circumferential direction of the tire as compared with the case that all cords are arranged at equal intervals.

As to the cord arrangement as packets, a section perpendicular to the longitudinal direction of the cord is shown in FIGS. 11a and 11b. On the other hand, FIG. 11c shows a case that the cords are individually arranged at equal intervals Po. By grouping the cords from a state of FIG. 11c to packets each containing three cords as shown in FIG. 11a can be made the interval Qi wider than the cord interval Po and hence the connection of cracks can be suppressed. Further, even if the cords are dispersed into packets each containing four cords and cord not included in the packet as shown in FIG. 11b, the interval Qi can be made wider to suppress the growth of cracks likewise the above case. As an embodiment of the packet, there can be adopted a case that the cords in the packet contact with each other in a packet 2-1 as shown at left hand part in FIG. 11a, a case that a slight interval is existent in the packet among three cords in a packet 2-2 as shown at a middle part thereof, and a case that the cords in the packet contact with each other and have a slight interval therebetween in a packet 2-3 as shown in a right hand part thereof, but the embodiment of the packet 2-2 is preferable in view of the prevention of fretting due to the contact of the cords.

Then, the number of cords in each packet 2 is preferable to be 2–5 cords. Because, the number of cords in the packet is required to be not less than 2 cords for making the interval between the packets large, but when it exceeds 5 cords, the rigidity in the belt treat becomes extremely non-uniform and the in-plane rigidity of the belt is not ensured to bring about the lacking of cornering power. Therefore, the number of cords is limited to 2–5 cords.

Furthermore, it is advantageous that the interval Pi between the adjoining cords in the packet 2 is 0.2–0.5 mm and the interval Qi between the packet 2 and the cord 1 adjacent to this packet 2 is 2–10 mm. That is, when the interval Pi is less than 0.2 mm, the progress of the cracks in the packet is increased, while when the interval Pi exceeds 0.5 mm, it is difficult to sufficiently ensure the interval QAi. On the other hand, when the interval Qi is less than 2 mm, the effect of suppressing the cracks between the packets is insufficient, while when the interval Qi exceeds 10 mm, the lowering of the cornering power is caused.

When plural cords are rendered into a packet and a cord interval thereof is an interval Pi (i=1 to n−1) slightly narrower than the aforementioned interval Po, if such packets are simply and alternately arranged with packets having a cord interval apparently wider than the above, it is feared that initial cracks at cut end faces of the cords in the packets connect to each other for a short time in accordance with the forming embodiment of the cord packet, the arranging embodiment of intervals of the packets and the like to form an apparently large crack in the circumferential direction.

For instance, as shown in FIG. 12, when an average number of cords embedded per unit width is N (cords) viewing from a direction perpendicular to the cords, a distance occupied in the widthwise direction per one cord 1/N (mm), which is equal to a sum of an average cord interval Po and a cord diameter d, so that it is 1/N=d+Po.

When n cords form a packet within the unit width as shown in FIG. 13, the widthwise distance occupied with these cords on average is a product of the above distance per one cord and the number n, which is equal to a sum of n×cord diameter, (n−1)×narrow cord interval and wide interval Qi between packets, so that it is n/N=n (d+Po)=Qi+nd+ $\Sigma Pi$(i=1 to n−1).

Therefore, a ratio of the interval Q1 to region n/N occupied by n cords is Qi÷(n/N)=Qi×N/n.

Moreover, when the packet is formed by n cords, the widthwise distance naturally occupied by these cords is n/N, the wide interval Qi is obtained by gathering the cords while narrowing the intervals in the packet, so that it is apparent that the interval Qi is sufficient to be made wider for suppressing the progress of cracks from the packet to the other packet. For this end, it is necessary to approach the cords to each other. In this case, however, the initial crack at the cut end of the cord immediately connects to the initial crack at the cut end of the adjoining cord to bring about the similar phenomenon having a large crack face from the initial stage as previously mentioned and the progressing rate of the crack becomes fast, and as a result, there is caused an inconvenience that the separation failure is not improved.

The inventors have experimentally examined a ratio of the interval Qi effective for suppressing the separation failure in view of these merits and demerits and found that when the ratio is $1/5 \leq Qi \times N/n \leq 3/4$, preferably $1/4 \leq Qi \times N/n \leq 2/3$, the progress of the cracks from the cord packet to the adjoining cord packet can be effectively suppressed to control the separation failure between the belt layers.

Moreover, it is self-evident that n is a natural number of 2 or more cords. Also, the interval Qi is desirable to satisfy a relation of Qi≧2Pi (i=1 to n), preferably Qi≧2Po with respect to any cord interval Pi in the cord packet.

In the invention, therefore, it is recommended to satisfy a relation of $1/5 \leq Qi \times N/n \leq 3/4$, preferably $1/4 \leq Qi \times N/n \leq 2/3$ in the belt layer in which the packet containing plural cords and similar packet or a cord adjacent thereto are arranged at an interval wider than a cord interval in the packet when an average number of cords embedded per unit width in a direction perpendicular to the cords, i.e. average value on the number of cords embedded per unit width as measured at sufficient intervals in the circumferential direction of the tire is N and the number of cords in each packet is n and the interval of the above wider portion in the direction perpendicular to the cords is Qi.

When the above interval Qi is view over the full circumference of the tire on average and a circumferential length at one side edge of the belt layer is L, if a relation of $L \times 1/5 \leq \Sigma(Qi/\sin \theta) \leq L \times 3/4$, preferably $L \times 1/4 \leq \Sigma(Qi/\sin \theta) \leq L \times 2/3$ is satisfied, the separation failure between the belt layers is suppressed more effectively over the whole of the tire.

Moreover, it is naturally expected that individual intervals Pi between the cords in the cord packet are smaller than the interval Po of cords uniformly arranged. Since the cord packet has an effect of making the circumferential length small at the side edge of the belt layer, there is not damaged the above effect even when the cords are projectedly overlapped with each other, or the interval Pi is zero, or the cords are partly contacted with each other at a state of existing projectedly overlapped portion as shown by various embodiments in FIG. 14.

In the invention, therefore, it is preferable to satisfy a condition of −d<Pi<Po when the cord interval in the cord packets of the belt layer is Pi and the cord interval for uniformly arranging cords of cord diameter d side by side over the full circumference is Po, and further to partly contact at least mutually adjoining two cords in the cord packet of the belt layer with each other.

In case of overlapping the cords or partly contacting them with each other in the projected plane as mentioned above, even if the cords are shifted by one cord with respect to the cord as a standard of the belt layer inward or outward in the radial direction of the tire, there is not damaged the aforementioned effect.

Therefore, it is preferable that a difference in radial distance between inscribed circle and circumscribed circle of the packet containing plural cords from an axial center of the tire is within a range of 1–3 times a diameter of the cord.

Moreover, when the cords in the packet are overlapped or partly contacted with each other, the interval Pi is represented as a negative value in the above equation relating to the cord interval Pi.

In case of a large-size tire with cords having a cord diameter d of not less than 1.8 mm, particularly a cord diameter d of not less than 2.5 mm as mentioned above, when force in a compression direction of the belt is input by forced deformation of the tread during the running on a bad road under loading, cord breakage is apt to be easily caused, which is serious when the cords are easily bent and deformed in the plane of the belt layer by making large the cord interval between the cord packets as previously mentioned, and hence the fatigue breakage of the cord is easily caused.

As a countermeasure, it is generally effective to make large a ratio of sectional secondary moment as an indication of cord bending rigidity to sectional area of cord. Moreover, it is experientially known to increase the bending rigidity as the filament diameter in the cord becomes large, but the limit of the filament diameter is 0.5 mm considering the conveniences in the production of the tire.

In the calculation of the cord bending rigidity, a case that sectional secondary moments of the filaments are merely added together is experientially an underestimation of the rigidity, while a case that all filaments are completely fixed with insulation rubber or the like is an overestimation. Under such a situation, it has been found that when a slip ratio k between filaments of core and sheath in the cord or between strands is 95%, the separation durability and the bending resistance of the cord can be simultaneously established by rendering the ratio I/A of sectional secondary moment to cord sectional area into not less than 0.015.

In this case, I and A are represented as follows:

$$I = \pi/64 \times \Sigma df_i^4 + (1-k)\pi/4 \times \Sigma(s_i^2 \times df_i^2)$$

$$A = \pi \times 4 \times \Sigma df_i^2$$

wherein $df_i$ is a diameter of i-th filament and $s_i$ is a distance of i-th filament from a center of the cord.

In the tire according to the invention, even when the diameter of the cord is not less than 1.8 mm, the occurrence of separation failure between the layers is effectively prevented while preventing the fatigue breakage of the cord by rendering the ratio I/A into not less than 0.015.

BRIEF DESCRIPTION OF THE DRAWINGS

FIG. 5 is a diagrammatically section view of a main part of the tire according to the invention;

BEST MODE FOR CARRYING OUT THE INVENTION

In a radial tire for a construction vehicle having a tire size of 40.00R57 and a section shown in FIG. 5, test tires are prepared by applying various specifications shown in Table 5 to belt layers in a belt B.

TABLE 5

| | Conventional Example | | Invention Example | |
| --- | --- | --- | --- | --- |
| Belt | Cord inclination angle (°) | Belt half-width | Cord inclination angle (°) | Belt half-width |
| 5B | 35 upward to the right | 440 | 35 upward to the right | 440 |
| 4B | 30 upward to the left | 350 | 30 upward to the left | 350 |
| 3B | 25 upward to the right | 400 | 25 upward to the right | 400 |
| 2B | 5 upward to the left | 170 | 5 upward to the left | 200 |
| 1B | 5 upward to the right | 200 | 5 upward to the right | 170 |

With respect to the thus obtained tires, a test for the durability on a drum is carried out by running the tire on a drum (diameter of 5 m) at a speed of 10 km/h under an internal pressure of 700 kPa and a load corresponding to 150% of a standard of The Tire and Rim Association to measure crack length generated between the small slant belt layers 1B and 2B. Moreover, plural tires having the same specification are prepared and simultaneously subjected to the drum running test, and one of the tires is cut every a given running distance to measure crack length. The measured results are shown in Table 6 and FIG. 15.

TABLE 6

| | Running distance | | | | | |
| --- | --- | --- | --- | --- | --- | --- |
| | 0 | 1000 | 2000 | 3000 | 3500 | 4500 |
| Conventional example + cords at equal intervals (mm) | 0 | 25 | 54 | 150 | 200 | — |
| Invention example + cords at equal intervals (mm) | 0 | 25 | 42 | — | 80 | 102 |
| Invention example + cord packets (mm:*) | 0 | — | 15 | — | 28 | 35 |

(*): according to Table 4

Figure 1A:
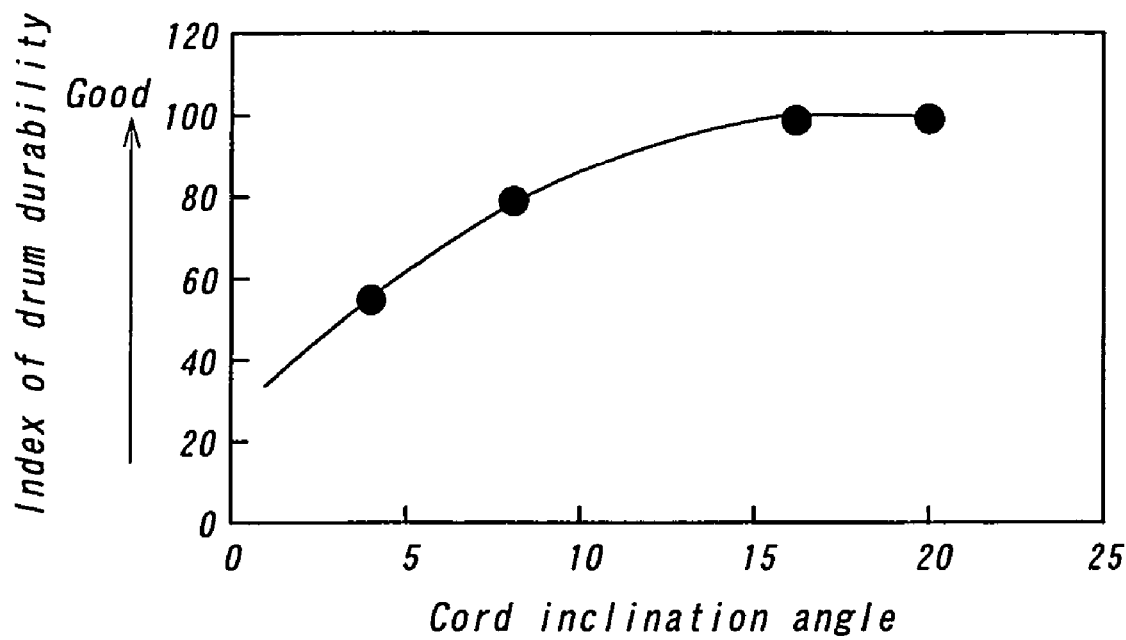
FIG. 1 is a graph showing a relation among cord inclination angle and belt durability and amount of tread size growth.
Figure 1B:
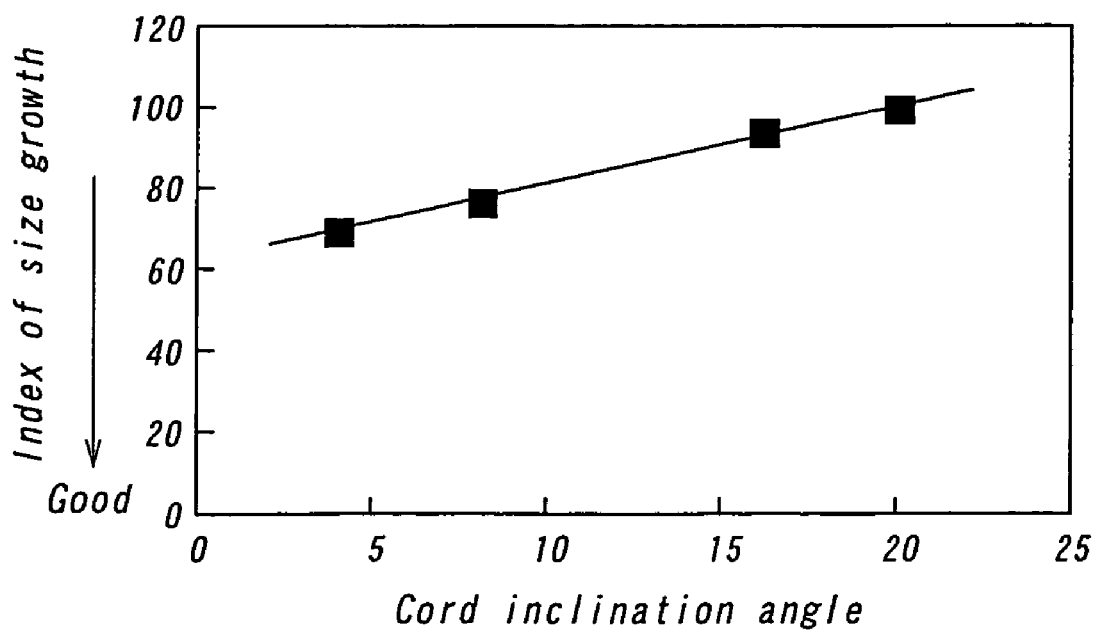
Figure 2A:
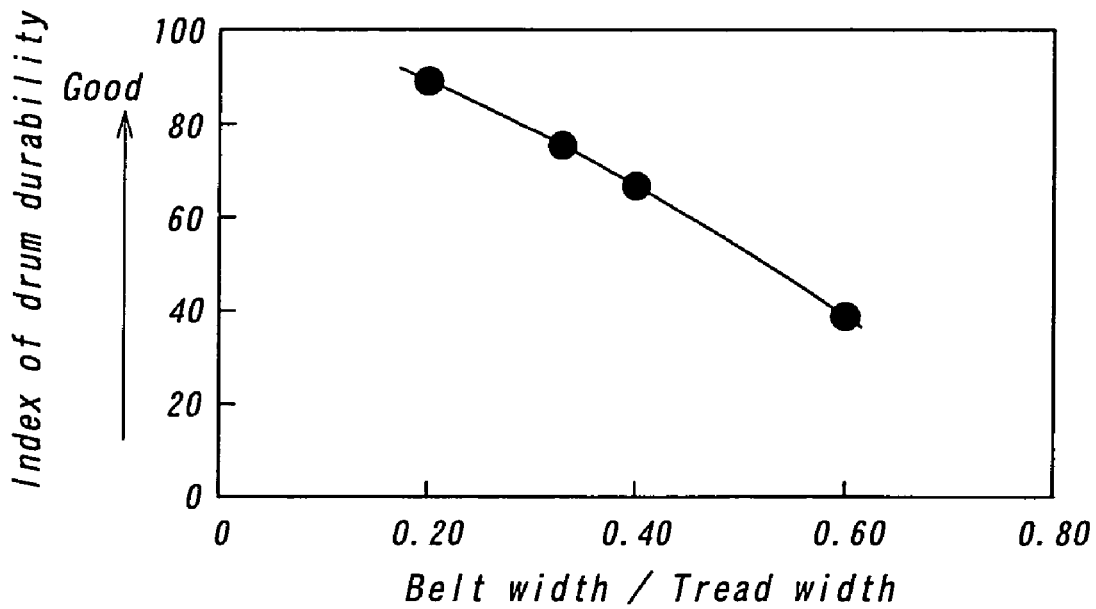
FIG. 2 is a graph showing a relation amount width of small slant belt layer and belt durability and amount of tread size growth.
Figure 2B:
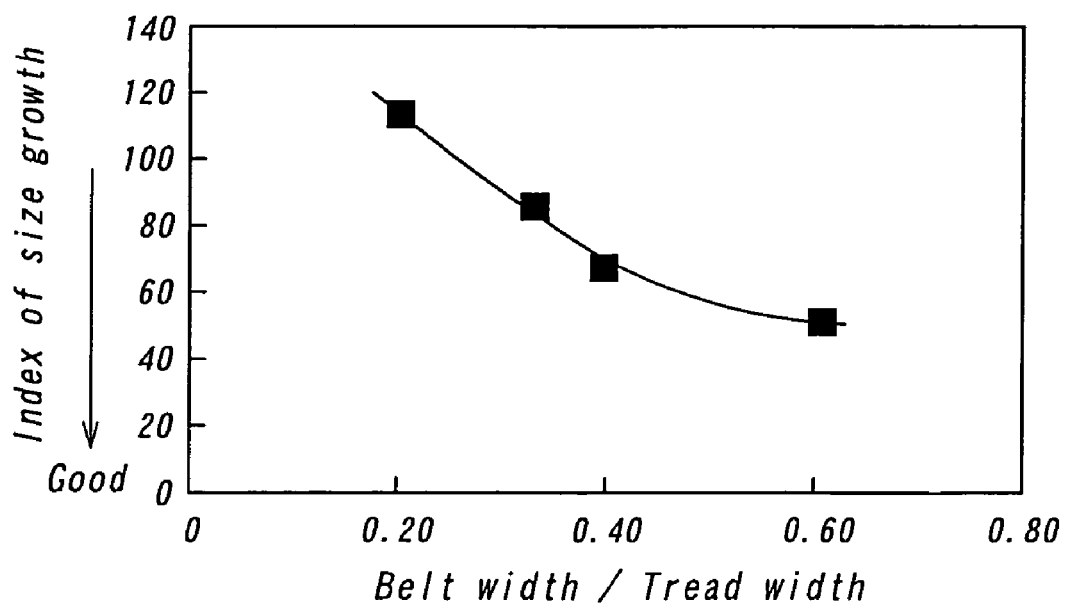
Figure 3:
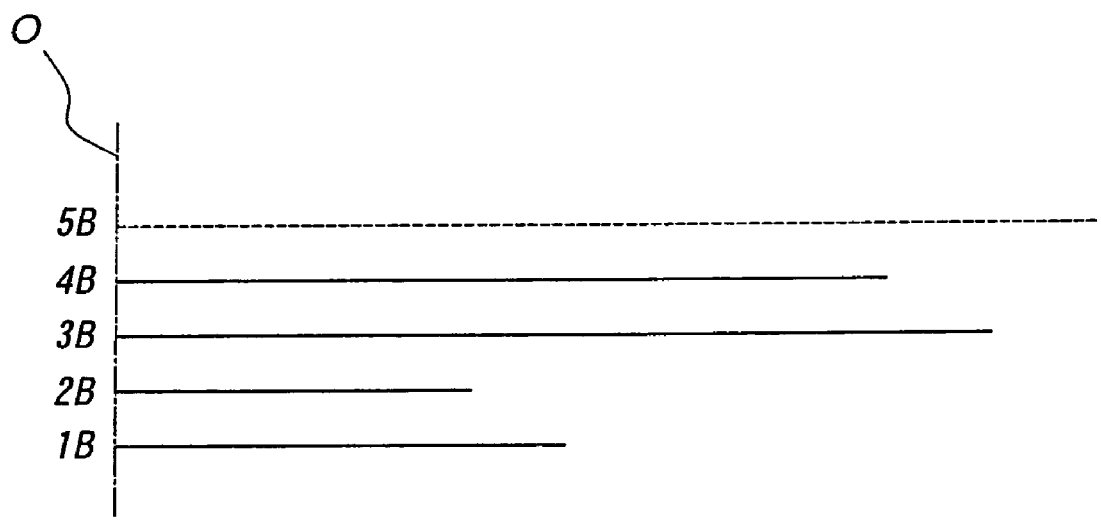
FIG. 3 is a schematic view of the conventional belt structure.
Figure 4A:
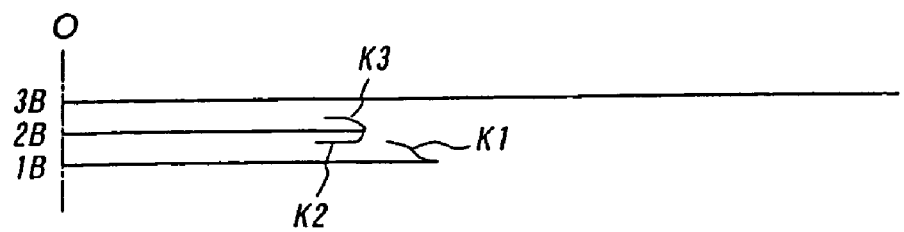
FIG. 4 is a schematic view illustrating propagation of cracks between laminated belt layers.
Figure 4B:
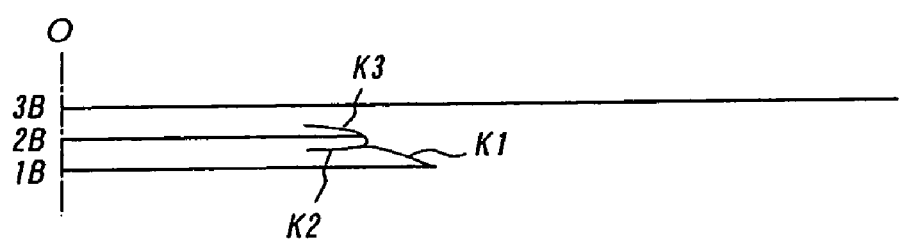
Figure 4C:
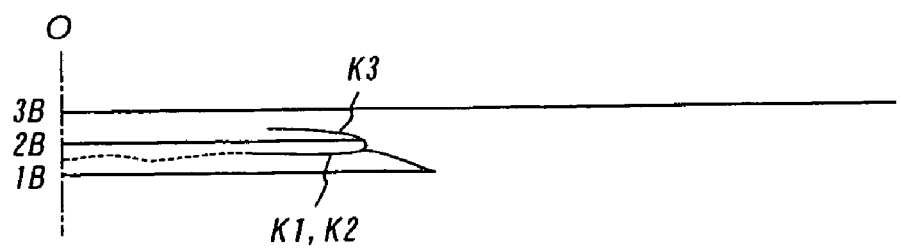
Figure 6A:
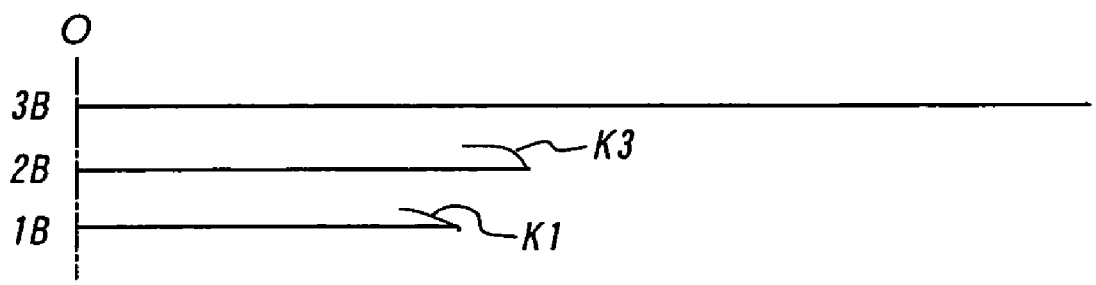
FIG. 6 is a schematic view illustrating occurrence of cracks in the belt according to the invention.
Figure 6B:
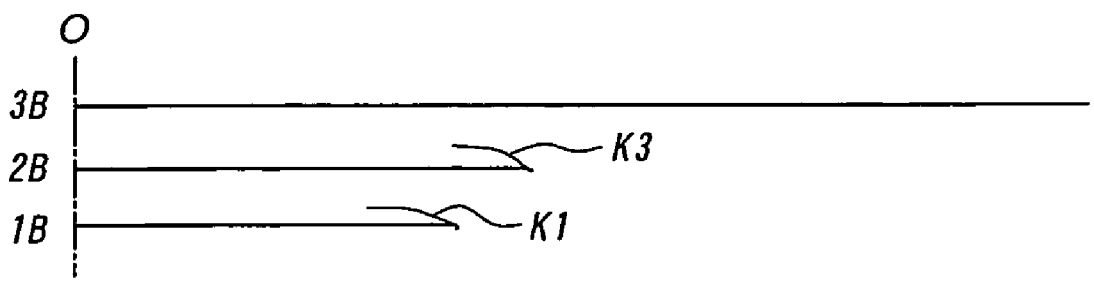
Figure 6C:
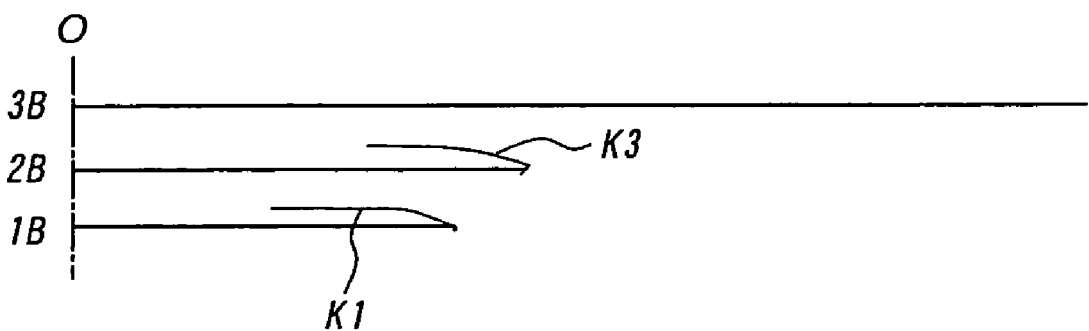
Figure 7:
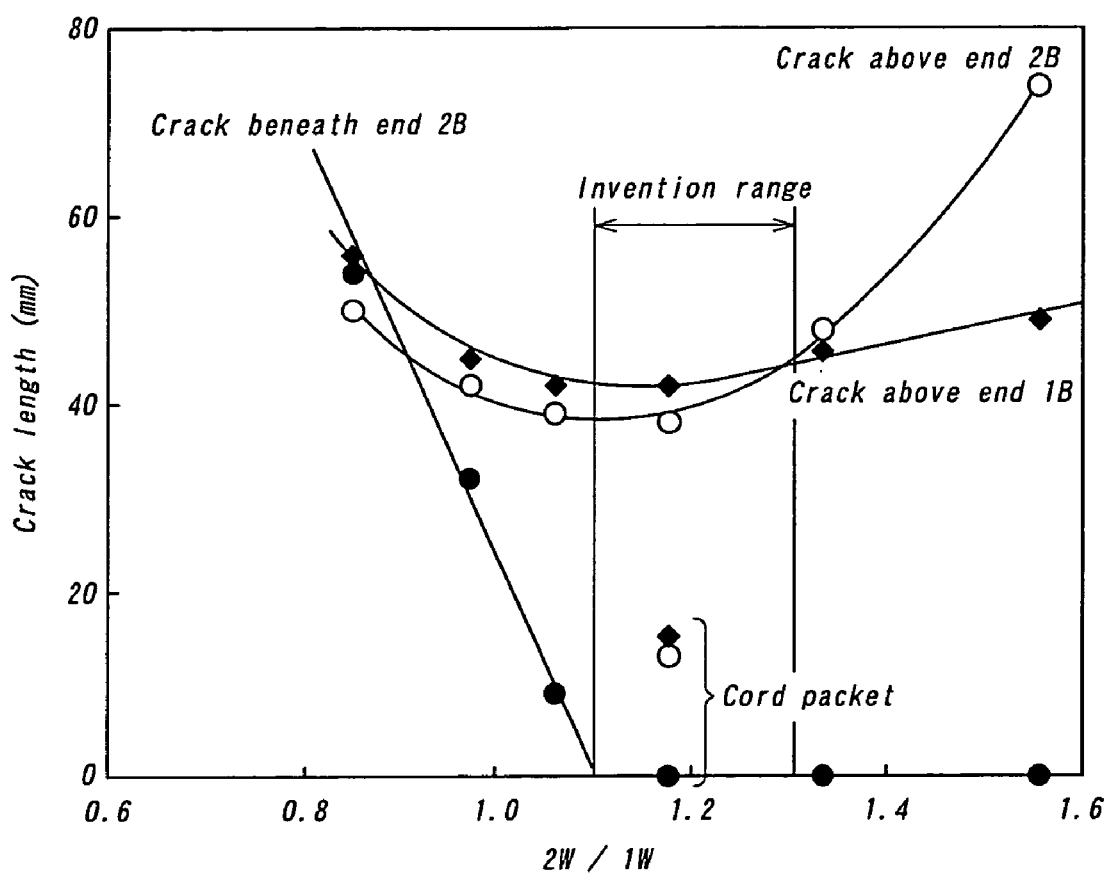
FIG. 7 is a graph showing a relation between width ratio of small slant belt layers and crack length.
Figure 8:
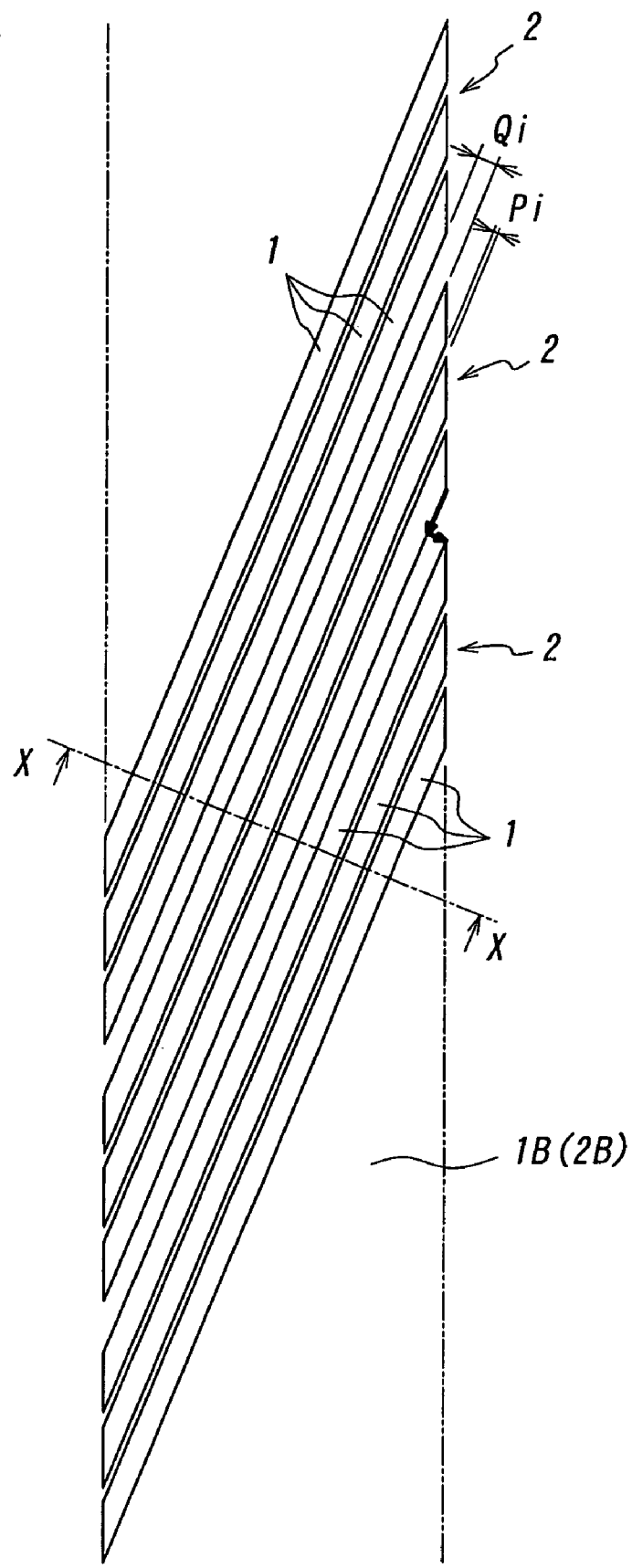
FIG. 8 is a diagrammatic view illustrating a cord arrangement in the small slant belt layers according to the invention.
Figure 9:
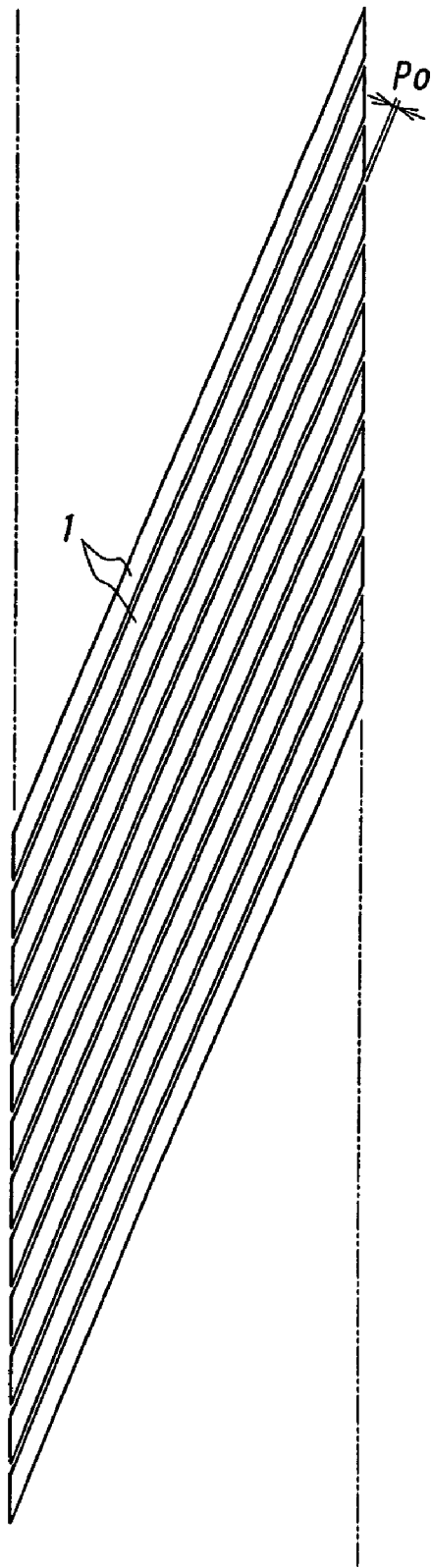
FIG. 9 is a diagrammatic view illustrating the conventional cord arrangement.
Figure 10:
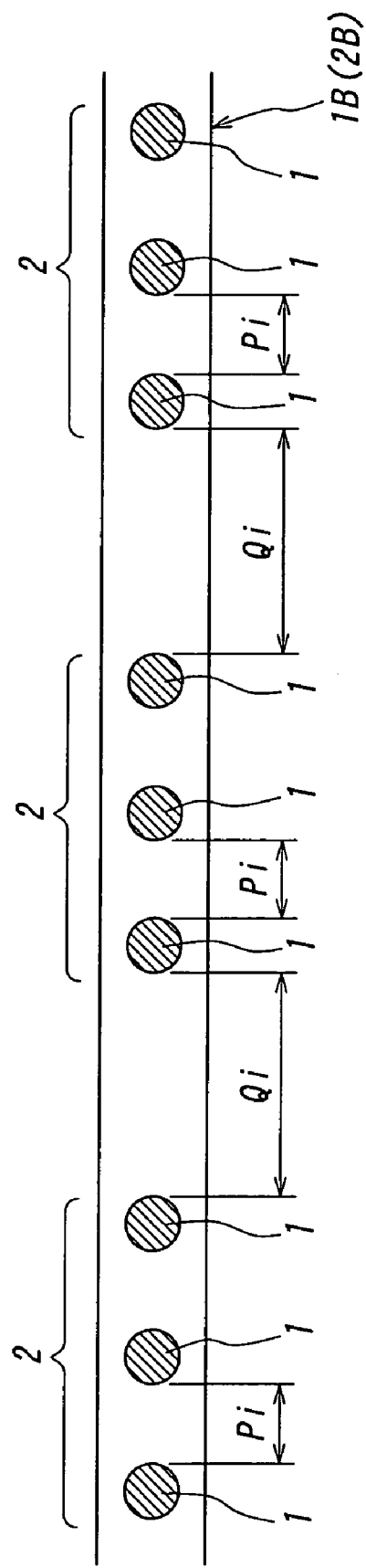
FIG. 10 is a diagrammatic view illustrating arrangement of cords in the small slant belt layer according to the invention.
Figure 11A:
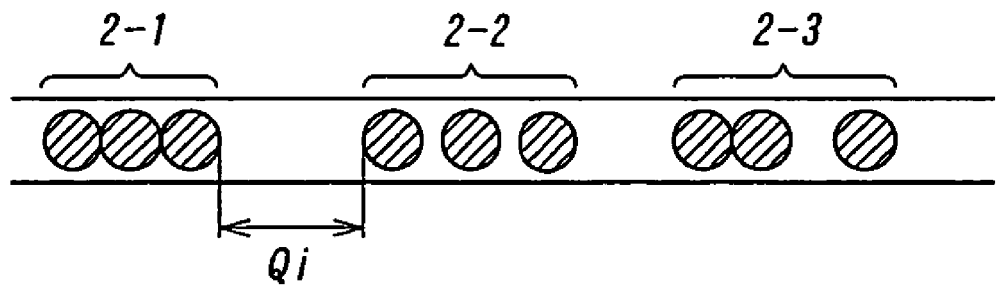
FIG. 11 is a diagrammatic view of cord arrangement.
Figure 11B:
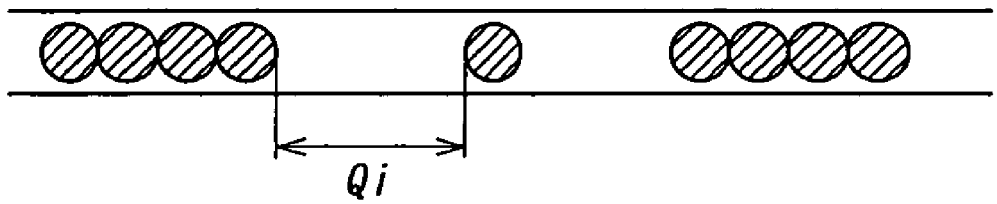
Figure 11C:
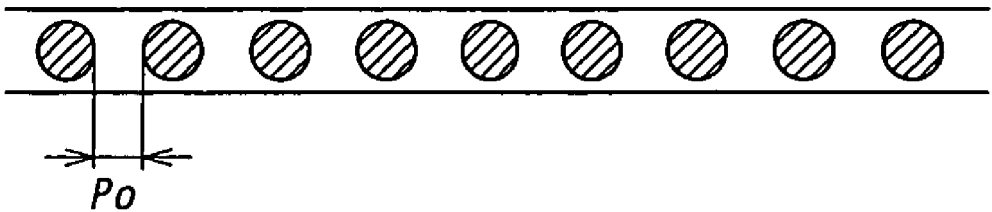
Figure 12:
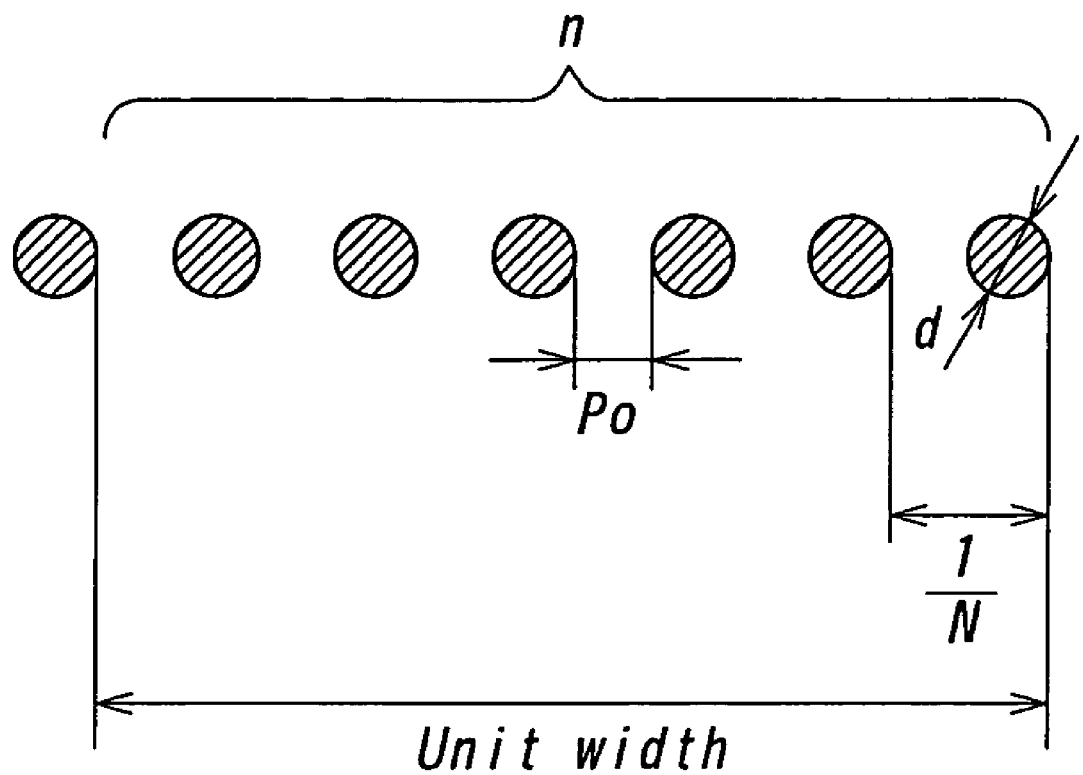
FIG. 12 is a diagrammatic view illustrating a case that all cords are arranged at equal intervals.
Figure 13A:
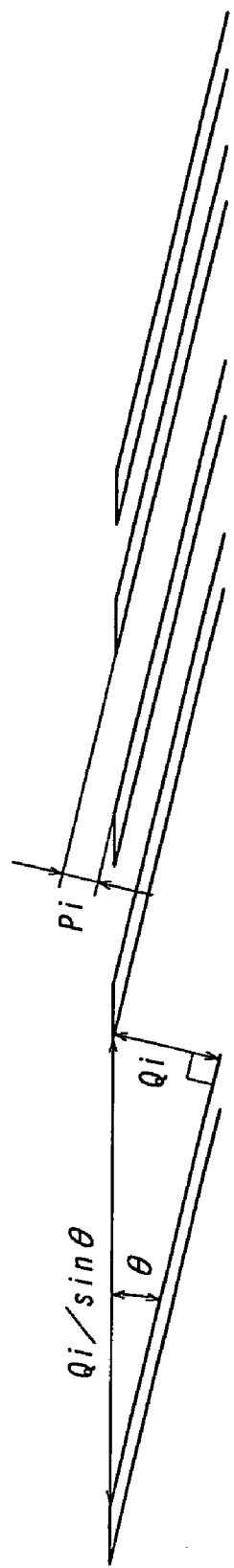
FIG. 13 is a diagrammatic view illustrating an embodiment of arranging cord packet.
Figure 13B:
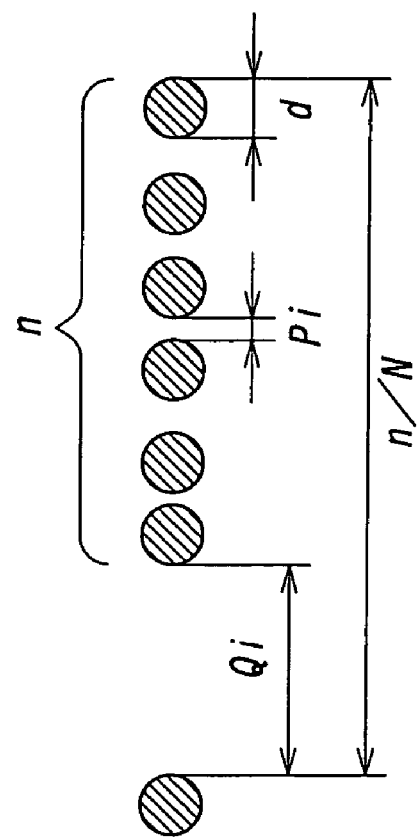
Figure 14A:
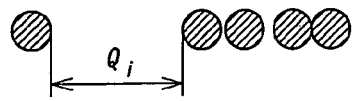
FIG. 14 is a diagrammatic view illustrating various cord arrangements according to the invention.
Figure 14H:
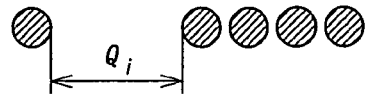
Figure 14B:
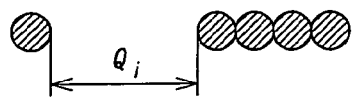
Figure 14I:
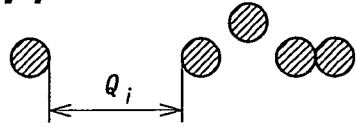
Figure 14C:
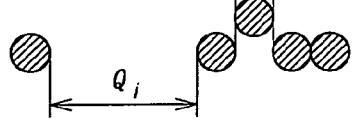
Figure 14J:
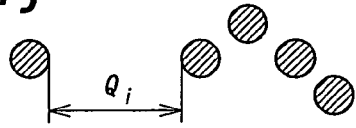
Figure 14D:
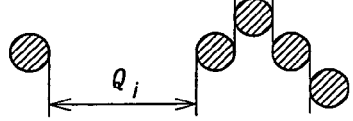
Figure 14E:
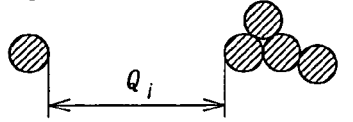
Figure 14F:
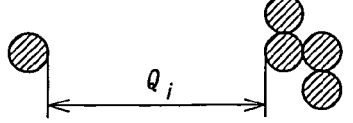
Figure 14G:
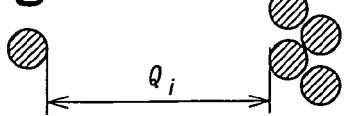
Figure 15:
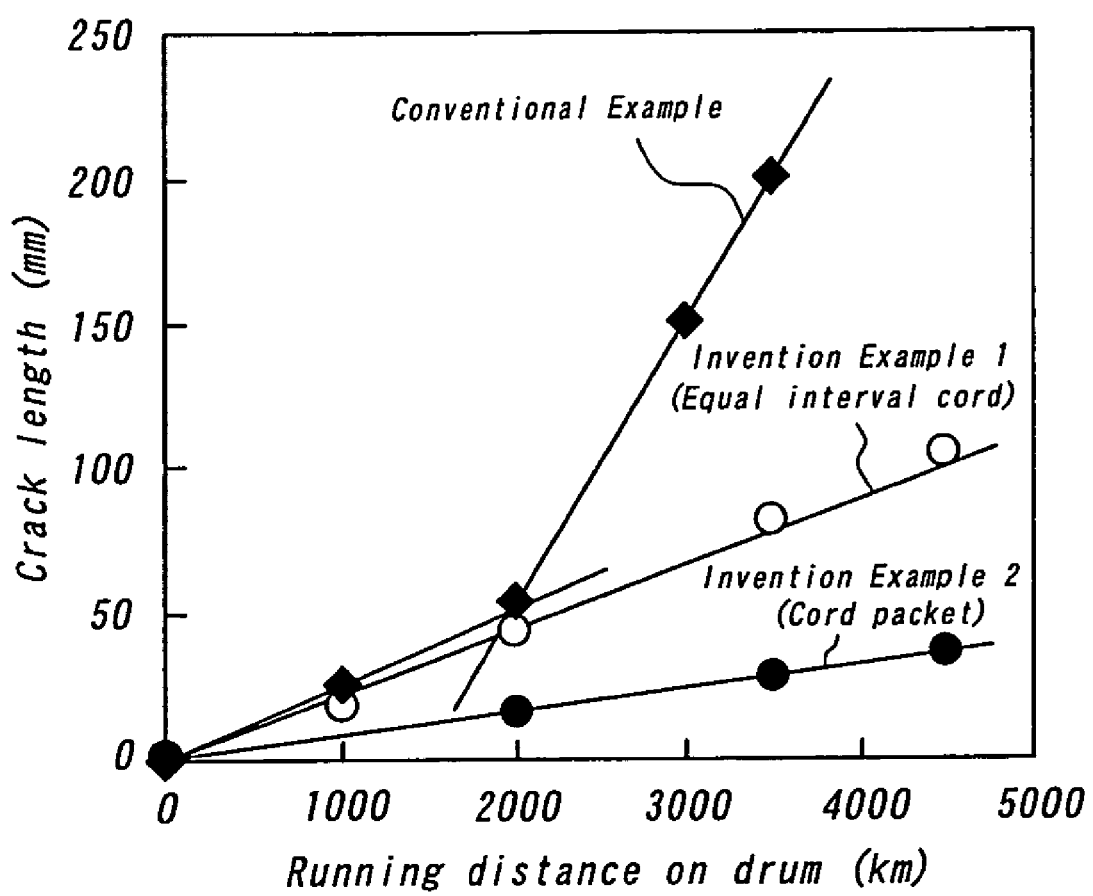
FIG. 15 is a graph showing a relation between running distance and crack length in various belt structures.

As seen from Table 6 and FIG. 15, belt troubles are caused at the running distance of 3800 km in the tire having the conventional belt structure. On the other hand, the tire having a belt width regulated according to the invention is completely run up to the running distance of 4500 km.

That is, in the tire having the conventional belt, cracks are connected to each other between the small slant belt layers 1B and 2B, and the progressing rate of cracks on and after the running distance of 2000 km becomes about 2 times, and separation failure between the belt layers is caused at a time that the crack length exceeds 200 mm and hence the running is impossible.

On the other hand, in the tire having the belt structure according to the invention, cracks are not generated beneath the small slant belt layer 2B, so that the connection of cracks between the belt layers is avoided and the generated cracks grow at the initial progressing rate as they are, and the crack length at the completion of running distance of 4500 km is about 100 mm, which is a half of the conventional example.

Further, the crack length in the belt layer having the arrangement of cord packets is controlled to about ⅓.

Moreover, with respect to the invention tires 1 and 2 according to the invention, as the amount of size growth at a central portion of a tread is measured when the internal pressure of the tire changes from 50 kPa to 700 kPa, there is not substantially caused the difference. This means that tension bearing is properly attained because the cord crossing angle and crossing width between the small slant belt layers dominating the size growth do not change as compared with the conventional belt.

INDUSTRIAL APPLICABILITY

The invention can effectively prevent the growth and progress of cracks in the vicinity of ends of cords used in the belt, which result in separation failure at widthwise ends of the belt regarded as a weak point in the tread reinforcement of the conventional radial tire.

The invention claimed is:

1. A radial tire comprising a belt of at least three rubberized layers arranged on an outer face of a crown portion of a carcass in a radial direction, each containing many cords extending obliquely with respect to an equatorial plane of the tire and cords of which layers being crossed with each other between adjoining layers, characterized in that two layers of the belt arranged toward a side of the carcass are small slant belt layers of many rubberized cords each extending at a cord inclination angle of not more than 15° with respect to the equatorial plane of the tire and having a width corresponding to 0.25–0.50 times a tread width in a width-wise direction of the tire, and a ratio W2/W1 of a width W2 of one belt layer to a width W1 of the other belt layer located toward the side of the carcass in the small slant belt layers is within a range of 1.1–1.3, wherein the one belt layer with width W2 is positioned radially outside of the other belt layer with width W1.

2. A radial tire according to claim 1, wherein the small slant belt layer has a cord arrangement that individual cords occupied in the layer are divided into plural packets each containing several cords and a distance between a packet and a cord adjacent thereto is widened as compared with an interval between adjoining cords in each of the packets.

3. A radial tire according to claim 2, wherein not less than 30% of the cords in the small slant belt layer are made into packets.

4. A radial tire according to claim 2, wherein the small slant belt layer satisfies the following relation:

$$1/5 \leq Qi \times N/n \leq 3/4$$

in which N is a mean number of cords embedded per unit width in a direction perpendicular to the cord of the small slant belt layer, and n is the number of cords in each packet, and Qi is a distance of an interval portion between a packet and a cord adjacent thereto in a direction perpendicular to the cord.

5. A radial tire according to claim 2, wherein a sum of length between cord packets in a circumferential direction of the tire $Qi/\sin\theta$ at one side edge of the small slant belt layer over a full circumference of the tire satisfies the following relation to a circumferential length L at such a side edge:

$$L \times 1/5 \leq \Sigma(Qi/\sin\theta) \leq L \times 3/4.$$

6. A radial tire according to claim 2, wherein an interval Pi between adjoining cords in the packet and an interval Po between cords when cords having a cord diameter d are uniformly arranged side by side over a full circumference of the tire satisfy the following relation:

$$-d < Pi < P0.$$

7. A radial tire according to claim 2, wherein at least two mutually adjoining cords in the packet are partly contacted with each other.

8. A radial tire according to claim 2, wherein a difference in radial distance between inscribed circle and circumscribed circle of the packet containing plural cords from an axial center of the tire is within a range of 1–3 times a diameter of the cord.

9. A radial tire according to claim 2, wherein the number of cords in each packet is 2–5.

10. A radial tire according to claim 2, wherein a distance between adjoining cords in each packet is 0.2–0.5 mm, and a distance from the packet to a cord adjacent thereto is 2–10 mm.

11. A radial tire according to claim 1, wherein a diameter of the cord is 2.5–4.0 mm.

12. A radial tire according to claim 1, wherein a ratio I/A of a sectional secondary moment I of the cord to a sectional area A of the cord is not less than 0.015.

* * * * *